United States Patent
Chen

(10) Patent No.: US 10,140,235 B2
(45) Date of Patent: Nov. 27, 2018

(54) SERVER

(71) Applicants: INVENTEC (PUDONG) TECHNOLOGY CORPORATION, Shanghai (CN); INVENTEC CORPORATION, Taipei (TW)

(72) Inventor: Huan-Huan Chen, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 20 days.

(21) Appl. No.: 15/456,455

(22) Filed: Mar. 10, 2017

(65) Prior Publication Data

US 2018/0157612 A1 Jun. 7, 2018

(30) Foreign Application Priority Data

Dec. 7, 2016 (CN) .......................... 2016 1 1115766

(51) Int. Cl.
*G06F 13/40* (2006.01)
*G06F 13/16* (2006.01)
*G06F 13/42* (2006.01)

(52) U.S. Cl.
CPC ...... *G06F 13/4027* (2013.01); *G06F 13/1673* (2013.01); *G06F 13/4282* (2013.01); *G06F 2213/0016* (2013.01)

(58) Field of Classification Search
CPC .......................... G06F 13/4027; G06F 13/1673
See application file for complete search history.

(56) References Cited

U.S. PATENT DOCUMENTS

| | | | |
|---|---|---|---|
| 2008/0250127 A1* | 10/2008 | Sugisawa ................ | H04L 41/00 709/221 |
| 2013/0166840 A1* | 6/2013 | Wu ........................ | G06F 3/0607 711/114 |
| 2014/0365713 A1* | 12/2014 | Chien ................... | G06F 3/0611 711/103 |
| 2015/0234766 A1* | 8/2015 | Weber ................. | G06F 13/4022 710/317 |
| 2016/0259568 A1* | 9/2016 | Grimsrud ............. | G06F 3/0613 |

* cited by examiner

*Primary Examiner* — Farley Abad
(74) *Attorney, Agent, or Firm* — Maschoff Brennan

(57) ABSTRACT

A server includes a main board, a bridge board and sub boards. The bridge board is electrically connected to the main board and the sub boards. The main board provides a data signal according to a transmission format of non-volatile memory express (NVME). The bridge board obtains the data signal according to the transmission format of NVME. The bridge board produces sub data signals according to the data signal or the transmission format of NVME. One of the sub boards obtains one of the sub data signals according to the transmission format of NVME. The bridge board instructs with one of the sub boards to detect the storage module in the sub board to produce at least one status parameter or produce at least one mode determination result.

7 Claims, 5 Drawing Sheets

SERVER

CROSS-REFERENCE TO RELATED APPLICATIONS

This non-provisional application claims priority under 35 U.S.C. § 119(a) on Patent Application No(s). 201611115766.X filed in China on Dec. 7, 2016, the entire contents of which are hereby incorporated by reference.

BACKGROUND

Technical Field

The disclosure relates to a server, more particularly to a server with a transmission interface of non-volatile memory express (NVME).

Related Art

Interfaces used in modern hard disk drives are generally a serial attached small computer system (SAS) interface or near-line SAS (NL-SAS) interface. Although SAS interfaces has been advanced from 6G interfaces to 12G interfaces, their bandwidths are still insufficient to solid state disks (SSDs) or other storage media using a phase change memory (PCM) or magneto-resistive random access memory. Also, the SAS interface has a disadvantage in terms of latency. Moreover, in some situations, when a peripheral component interconnect express (PCIE) interface card is directly connected to a main board, the wiring of the PCIE interface card may affect the main board.

SUMMARY

According to one or more embodiments, the disclosure provides a server including: a main board for providing a data signal according to a transmission format of NVME; a bridge board, electrically connected to the main board, for obtaining the data signal according to the transmission format of NVME, and producing sub data signals according to the data signal and the transmission format of NVME; and sub boards electrically connected to the bridge board, each of the sub boards comprising storage modules, one of the sub boards configured to obtain one of the sub data signals according to the transmission format of NVME, and one of the sub boards configured to provide the sub data signal to the storage modules of the sub board according to the transmission format of NVME after receiving the sub data signal. The bridge board, according to a command of the main board, controls one of the sub boards to produce at least one status parameter or at least one mode determination result by detecting at least one of the storage modules.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
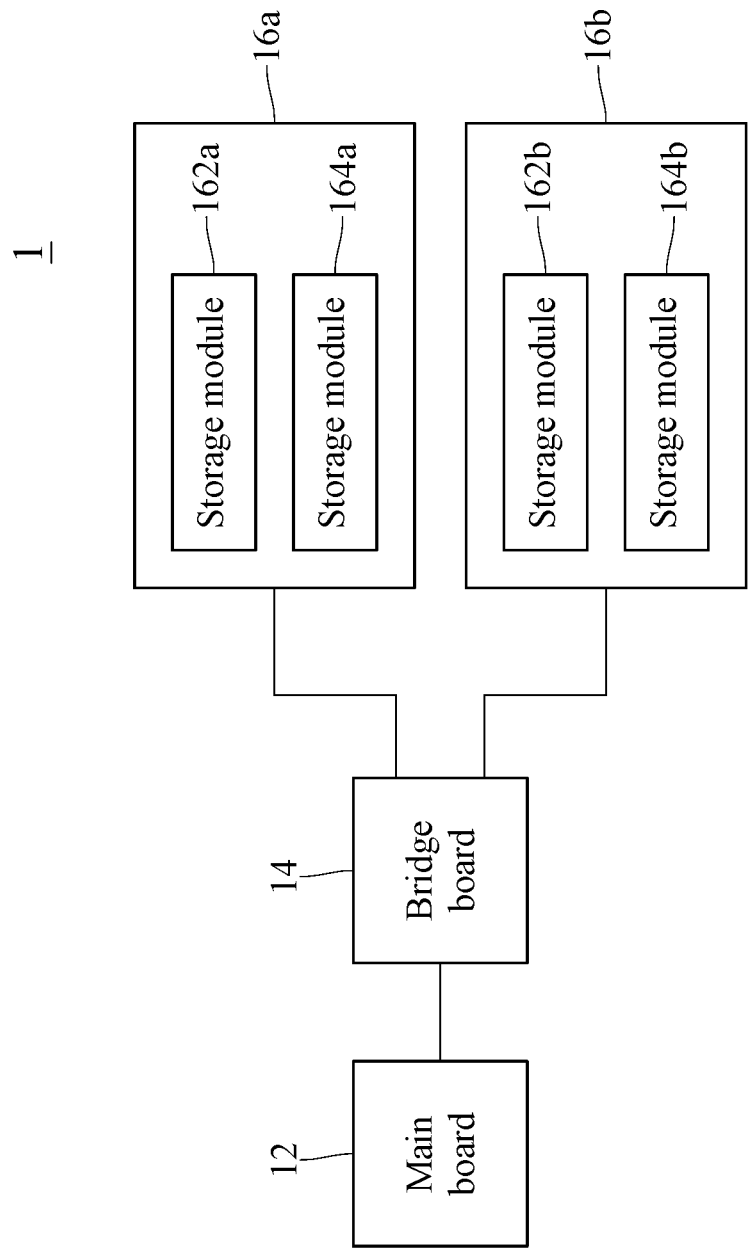
FIG. 1 is a functional block diagram of a server according to an embodiment of the disclosure.

Refer to FIG. 1. FIG. 1 is a functional block diagram of a server according to an embodiment of the disclosure. As shown in FIG. 1, a server 1 includes a main board 12, a bridge board 14, and sub boards. In the embodiment, as shown in FIG. 1, sub boards 16a and 16b are taken for an exemplary description, but the number of sub boards is not limited to this. The sub board includes storage modules. For the sub board 16a, a storage module 162a and a storage module 164a are included. Hereafter, the disclosure does not intend to limit the number of storage modules of each sub board. The bridge board 14 is electrically connected to the main board 12. The sub boards 16a and 16b are electrically connected to the bridge board 14. For example, the storage modules 162a and 164a are hard disk drives (HDDs) or solid state disks (SSDs), but the disclosure does not intend to limit the hardware configuration of the storage module.

The main board 12 provides a data signal according to a transmission format of NVME.

The bridge board 14 obtains the data signal according to the transmission format of NVME, produces sub data signals according to the data signal and the transmission format of NVME.

One of the sub boards 16a and 16b obtains one of the sub data signals according to the transmission format of NVME. One of the sub boards 16a and 16b provides the sub data signal to the storage modules of the sub boards 16a and 16b according to the transmission format of NVME after receiving the sub data signal. Take the sub board 16a as an example, and the sub board 16a provides a sub data signal to the storage modules 162a and 164a according to the transmission format of NVME after receiving it. The sub boards 16a and 16b are, for example, located on the same back plane, but the disclosure does not intend to limit it.

The bridge board 14, according to a command of the main board 12, controls one of the sub boards 16a and 16b to produce at least one status parameter or at least one mode determination result by detecting at least one of the storage modules of the sub board. For example, the bridge board 14, according to a command of the main board 12, controls the sub board 16a to produce at least one status parameter or at least one mode determination result by detecting the storage modules 162a and 164a. Said status parameter is, for example, the operating frequencies, the data throughputs, the amounts of error data or the numbers of error sector of the storage modules 162a and 164a, and said mode determination result is, for example, that the storage module is possibly going to be damaged, the storage module has been damaged, the storage module is normal, the storage module is being read, or the storage module is used as one storage unit among a redundant array of independent disks (RAID); and however, the disclosure is not limited to them.

Figure 2:
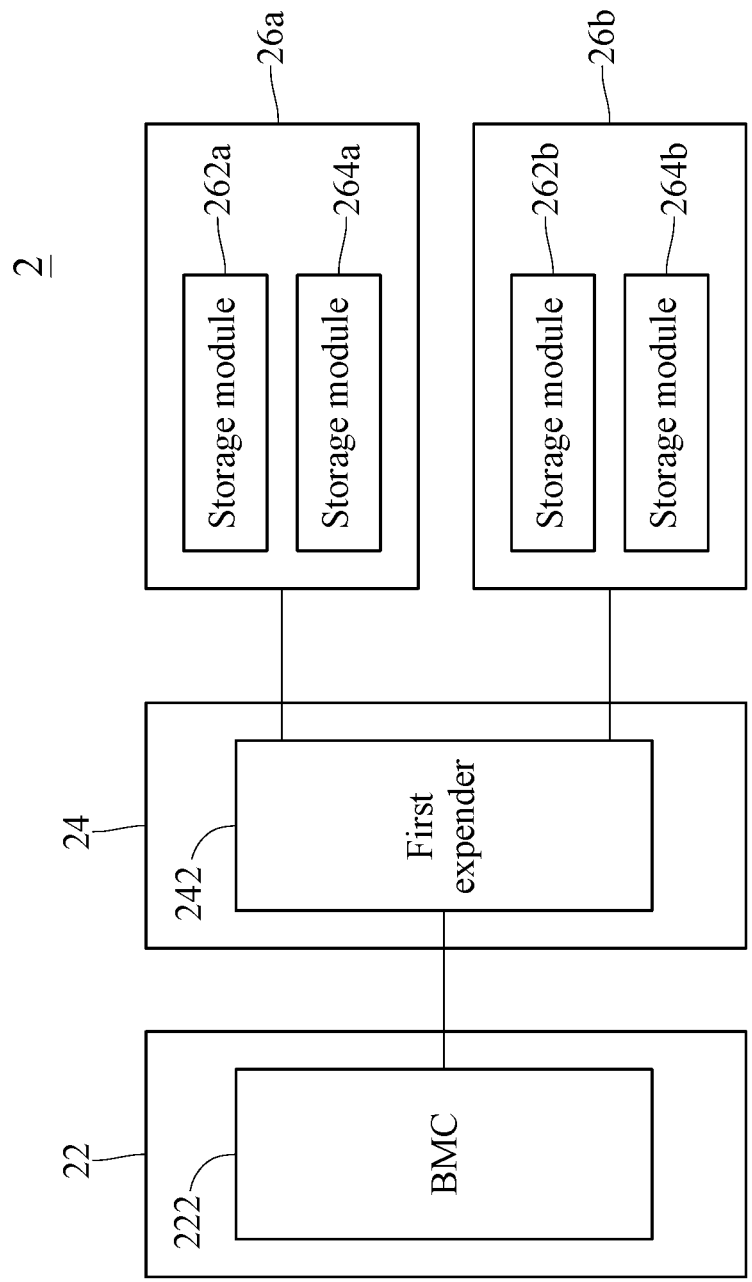
FIG. 2 is a functional block diagram of a server according to another embodiment of the disclosure.

Refer to FIG. 2. FIG. 2 is a functional block diagram of a server according to another embodiment of the disclosure. In the embodiment, as shown in FIG. 2, the main board further includes a baseboard management controller (BMC) 222, and the bridge board 24 further includes a first expender 242. The baseboard management controller 222 provides a baseboard control signal according to an inter-integrated circuit (I2C) transmission format. The first expender 242 produces sub baseboard control signals according to the baseboard control signal. In an embodiment, the baseboard control signal is a 4×4 signal of PCIE standard, and the sub baseboard control signal is a 2×4 signal of PCIE standard derived from the baseboard control signal. The format of the baseboard control signal and the format of the sub baseboard control signal are not limited to the aforementioned examples, and all those having ordinary skill in the art can define them according to particular requirements of hardware after reading the disclosure. For example, in an embodiment, the server includes three sub boards, the baseboard control signal is a 6×4 signal of PCIE standard, and the sub baseboard control signal is a 2×4 signal of PCIE standard derived from the baseboard control signal. In another embodiment, the server includes three sub boards, the baseboard control signal is a 6×4 signal of PCIE standard, and the sub baseboard control signal includes a 1×4 signal of PCIE standard, a 2×4 signal of PCIE standard and a 3×4 signal of PCIE standard which are derived from the baseboard control signal. However, the disclosure is not limited to the above examples.

The bridge board 24 provides one of the sub baseboard control signals to one of the sub boards 26a and 26b according to the I2C transmission format. One of the sub baseboard control signals is used to command one of the sub boards 26a and 26b to produce at least one status parameter by detecting at least one of the storage modules of the sub board.

Figure 3:
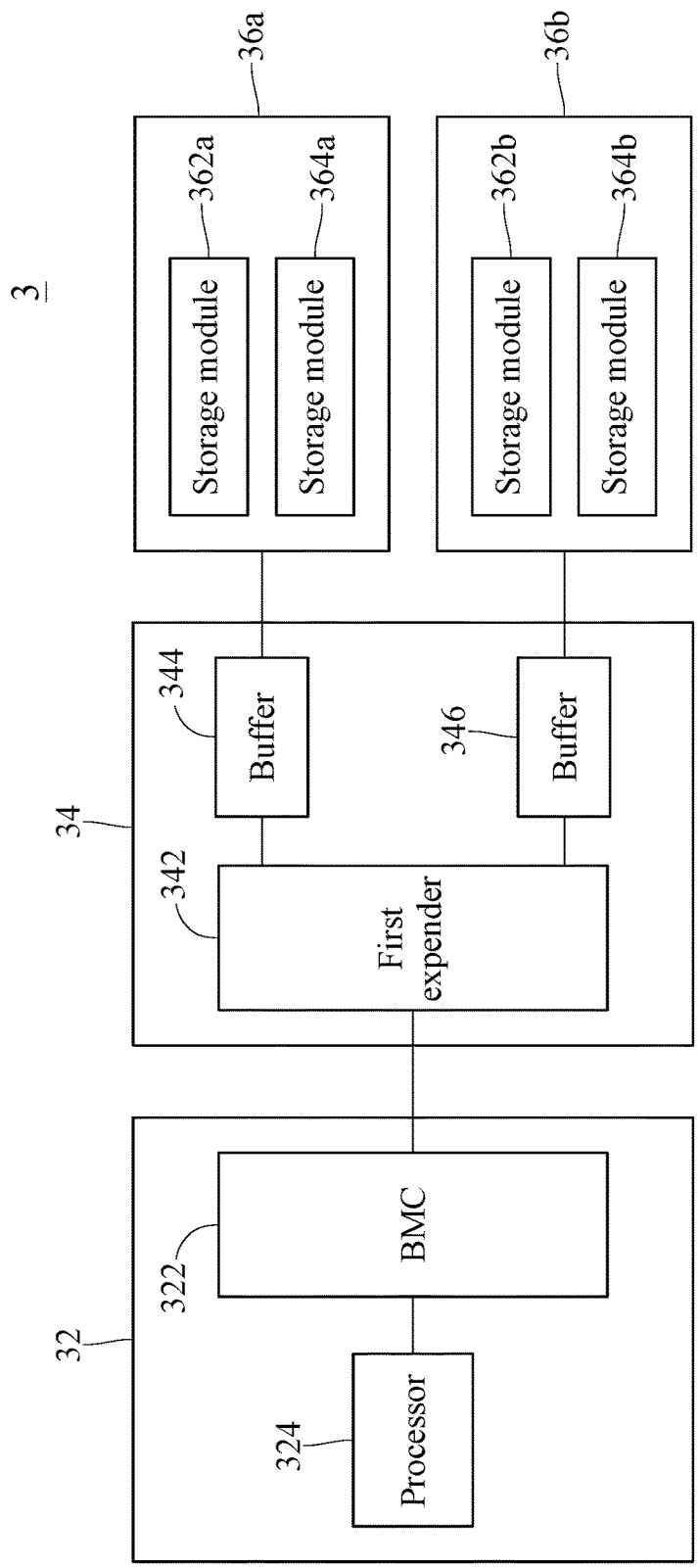
FIG. 3 is a functional block diagram of a server according to yet another embodiment of the disclosure.

Refer to FIG. 3, which is a functional block diagram of a server according to yet another embodiment of the disclosure. In the embodiment, as shown in FIG. 3, a main board 32 further includes a processor 324, and a bridge board 34 further includes buffers 344 and 346. In this embodiment, the number of buffers corresponds to the number of sub boards, but the disclosure is not limited to it. The processor 324 is electrically connected to a baseboard management controller 322. The buffer 344 is electrically connected to the first expender 342 and the sub board 36a, and the buffer 346 is electrically connected to the first expender 342 and the sub board 36b.

The processor 324 provides a processor control signal according to the I2C transmission format. A different buffer produces a different sub processor control signal according to the processor control signal. The bridge board 34 provides one of the sub processor control signals to one of the sub boards according to the I2C transmission format. In this embodiment, the buffer 344 produces a first sub processor control signal according to the processor control signal, and the first sub processor control signal is provided to the sub board 36a. The buffer 346 produces a second sub processor control signal according to the processor control signal, and the second sub processor control signal is provided to the sub board 36b. One of the sub processor control signals is used to command one of the sub boards 36 and 36b to produce at least one mode determination result by detecting at least one of the storage modules of the sub board. For example, the sub board 36a detects at least one of the storage modules 362a and 364a according to the sub processor control signal provided by the buffer 344, to produce at least one mode determination result. In an embodiment, the processor 324 provides a data signal.

Figure 4:
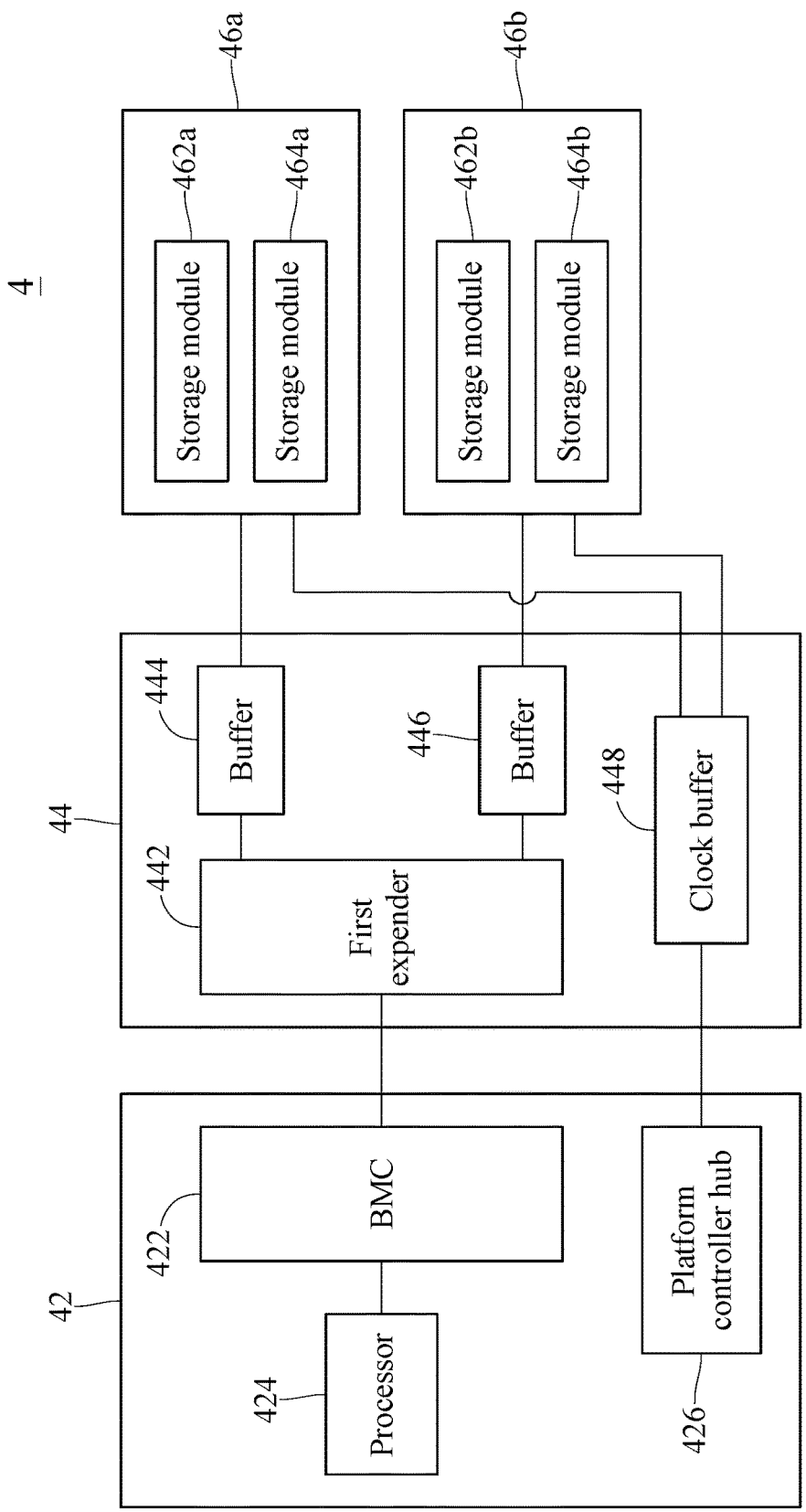
FIG. 4 is a functional block diagram of a server according to yet another embodiment of the disclosure.

Refer to FIG. 4, which is a functional block diagram of a server according to yet another embodiment of the disclosure. In the embodiment, as shown in FIG. 4, a main board 42 further includes a platform controller hub (PCH) 422, and a bridge board 44 further includes a clock buffer 448. The platform controller hub 426 is electrically connected to the clock buffer 448, and the clock buffer 448 is electrically connected to sub boards 46a and 46b.

The platform controller hub 422 provides a clock signal. The clock buffer 448 produces sub clock signals according to the clock signal. The bridge board 44 provides at least one of the sub clock signals to one of the sub boards. The clock signal indicates a first clock, and each sub clock signal indicates second clocks. The first clock and each second clock can be the same or different, and the second clocks are different or the same; and the disclosure is not limited thereto.

Figure 5:
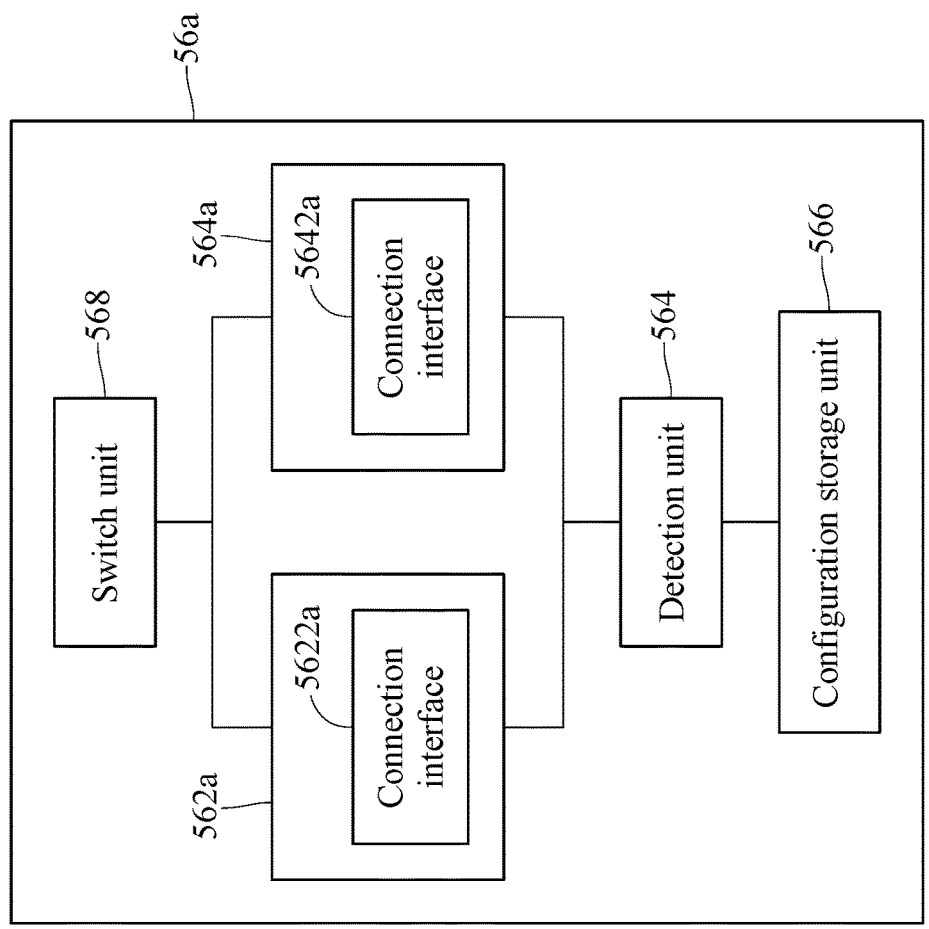
FIG. 5 is a functional block diagram of a server according to yet another embodiment of the disclosure.

Refer to FIG. 5, which is a functional block diagram of a server according to yet another embodiment of the disclosure. In the embodiment, as shown in FIG. 5, the following exemplary description is based on sub boards 56a. One of the sub boards 56a further includes a detection unit 564, a configuration storage unit 566, and a switch unit 568, and the storage module 562a and the storage module 564a of the sub board 56 further include a connection interface 5622a and a connection interface 5642a, respectively. The detection unit 564 is electrically connected to the storage module 562a and the storage module 564a.

The configuration storage unit 566 is electrically connected to the detection unit 564. The switch unit 568 is electrically connected to the storage module 562a and the storage module 564a.

The configuration storage unit 566 stores setting configuration associated with the detection unit 564. The detection unit 564 detects the storage modules 562a and 564a of the sub board 56a according to the setting configuration stored in the configuration storage unit 566. The setting configuration is, for example, the temperature, data and relevant settings related to the storage modules 562a and 564a, and this embodiment does not intend to limit it.

The switch unit 568 receives the aforementioned sub baseboard control signal and selectively provides the sub baseboard control signal to either the storage module 562a or the storage module 564a, so as to efficiently save the back plane space and ensure the normal operation of the storage modules.

The storage modules 562a and 564a are electrically connected to the housing of the server respectively through the connection interfaces 5622a and 5642a. The relevant circuits on the housing receive the sub baseboard control signal respectively through the connection interfaces 5622a and 5642a for analysis and control or for providing this signal to an external device.

To sum up, the disclosure provides a server, in which a transmission interface of non-volatile memory express is directly connected to a center processing unit through a PCIE standard bus, so the server may reduce the latency in hardware and software. In the basis of the above configuration, the server in the disclosure further has the use of multi-thread, the parallel access and the deeper queue depth. On the other hand, the system is capable of automatically identifying interface cards supporting the transmission interface of non-volatile memory express and busses of PCIE standard, and does not need to additionally add any driving circuit or install any driving program, and thus, it is convenient for users to use the system. Moreover, the accommodating space in the housing may be efficiently used. Therefore, the disclosure may be very practical.

What is claimed is:

1. A server, comprising:
a main board for providing a data signal according to a transmission format of non-volatile memory express (NVME);
a bridge board, electrically connected to the main board, for obtaining the data signal according to the transmission format of NVME, and producing sub data signals according to the data signal and the transmission format of NVME; and
sub boards electrically connected to the bridge board, each of the sub boards comprising storage modules, one of the sub boards configured to obtain one of the sub data signals according to the transmission format of NVME, and one of the sub boards configured to provide the sub data signal to the storage modules of the sub board according to the transmission format of NVME after receiving the sub data signal;
wherein the bridge board, according to a command of the main board, controls one of the sub boards to produce at least one status parameter or at least one mode determination result by detecting at least one of the storage modules, the main board further comprises a processor for providing a processor control signal according to a I2C transmission format, the bridge board comprises buffers, each of the buffer is configured to produce a corresponding sub processor control signal according to the processor control signal, the bridge board provides one of the sub processor control signals to one of the sub boards according to the I2C transmission format, and one of the sub processor control signals is configured to control one of the sub boards to produce the at least one mode determination result by detecting at least one of the storage modules.

2. The server according to claim 1, wherein the main board further comprises a baseboard management controller (BMC) for providing a baseboard control signal according to an inter-integrated circuit (I2C) transmission format, the bridge board further comprises a first expender for producing sub baseboard control signals according to the baseboard control signal, and the bridge board provides one of the sub baseboard control signals to one of the sub boards according to the I2C transmission format, and one of the sub baseboard control signals is configured to control one of the sub boards to produce at least one status parameter by detecting at least one of the storage modules.

3. The server according to claim 2, wherein one of the sub boards further comprises a switch unit electrically connected to the storage modules of the sub board and configured to receive the sub baseboard control signal and selectively provide the sub baseboard control signal to the storage modules.

4. The server according to claim 2, wherein each of the storage modules of one of the sub boards further comprises a connection interface, the storage modules of the one of the sub boards are electrically connected to a housing through the connection interfaces, and the housing receives the sub baseboard control signals through the connection interfaces, respectively.

5. The server according to claim 1, wherein the processor provides the data signal.

6. The server according to claim 1, wherein the main board further comprises a platform controller hub (PCH) for providing a clock signal, the bridge board further comprises a clock buffer for producing sub clock signals according to the clock signal, and the bridge board provides one of the sub clock signals to one of the sub boards.

7. The server according to claim 1, wherein one of the sub boards further comprises a detection unit and a configuration storage unit, the configuration storage unit is configured to store a setting configuration related to the detection unit, and the detection unit is configured to detect the storage modules of the sub board according to the setting configuration stored in the configuration storage unit.

* * * * *